US009596122B2

(12) United States Patent
Hinton et al.

(10) Patent No.: US 9,596,122 B2
(45) Date of Patent: *Mar. 14, 2017

(54) IDENTITY PROVIDER DISCOVERY SERVICE USING A PUBLISH-SUBSCRIBE MODEL

(75) Inventors: Heather Maria Hinton, Austin, TX (US); Richard James McCarty, Austin, TX (US); Clifton Steve Looney, Port Saint Lucie, FL (US)

(73) Assignee: International Business Machines Corporation, Armonk, NY (US)

( * ) Notice: Subject to any disclaimer, the term of this patent is extended or adjusted under 35 U.S.C. 154(b) by 1269 days.

This patent is subject to a terminal disclaimer.

(21) Appl. No.: 13/403,565

(22) Filed: Feb. 23, 2012

(65) Prior Publication Data

US 2013/0227099 A1 Aug. 29, 2013

(51) Int. Cl.
*G06F 15/173* (2006.01)
*H04L 12/24* (2006.01)
(Continued)

(52) U.S. Cl.
CPC .......... *H04L 41/00* (2013.01); *H04L 63/0815* (2013.01); *H04L 67/16* (2013.01);
(Continued)

(58) Field of Classification Search
CPC . H04L 63/0816; H04L 67/16; H04L 67/2842; H04L 67/26; H04L 67/2814
(Continued)

(56) References Cited

U.S. PATENT DOCUMENTS 8,505,085 B2 * 8/2013 Logan et al. ................ 726/9
2006/0136990 A1 6/2006 Hinton et al.
(Continued)

FOREIGN PATENT DOCUMENTS

WO WO2007113409 10/2007

OTHER PUBLICATIONS

PCT/US13/050741, International Search Report and Written Opinion, Jul. 4, 2013.
(Continued)

*Primary Examiner* — Nam Tran
(74) *Attorney, Agent, or Firm* — Richard A. Wilhelm; David H. Judson

(57) ABSTRACT

A proxy is integrated within an F-SSO environment and interacts with an external identity provider (IdP) instance discovery service. The proxy proxies IdP instance requests to the discovery service and receives responses that include the IdP instance assignments. The proxy maintains a cache of the instance assignment(s). As new instance requests are received, the cached assignment data is used to provide appropriate responses in lieu of proxying these requests to the discovery service, thereby reducing the time needed to identify the required IdP instance. The proxy dynamically maintains and manages its cache by subscribing to updates from the discovery service. The updates identify IdP instance changes (such as servers being taken offline for maintenance, new services being added, etc.) occurring within the set of geographically-distributed instances that comprise the IdP service. The updates are provided via a publication-subscription model such that the proxy receives change notifications proactively.

18 Claims, 8 Drawing Sheets

(51) Int. Cl.
 H04L 29/08 (2006.01)
 H04L 29/06 (2006.01)
(52) U.S. Cl.
 CPC .......... *H04L 67/28* (2013.01); *H04L 67/2814* (2013.01); *H04L 67/2842* (2013.01); *H04L 67/02* (2013.01)
(58) Field of Classification Search
 USPC ........................................................ 709/223
 See application file for complete search history.

(56) References Cited

U.S. PATENT DOCUMENTS

| 2006/0200424 | A1 | 9/2006 | Cameron |
| 2006/0218625 | A1* | 9/2006 | Pearson et al. ................... 726/4 |
| 2006/0235973 | A1 | 10/2006 | McBride et al. |
| 2007/0288320 | A1 | 12/2007 | Cooper et al. |
| 2008/0014931 | A1 | 1/2008 | Yared et al. |
| 2008/0046366 | A1 | 2/2008 | Bemmel et al. |
| 2009/0307744 | A1 | 12/2009 | Nanda et al. |
| 2010/0011421 | A1* | 1/2010 | Chari et al. ....................... 726/5 |
| 2010/0071056 | A1* | 3/2010 | Cheng et al. ................... 726/16 |
| 2012/0144034 | A1* | 6/2012 | McCarty ............ H04L 63/0815 709/225 |

OTHER PUBLICATIONS

Van Tran et al, "Identity Federation in a Multi Circle-of-Trust Constellation," Mar. 2007.
RSA Federated Identity Manager, Jul. 2007.
Deliverable DS3.14.1: GEANT2 Identity Provider (GIdP) Design, Mar. 2007.
Elahi, et al, "Trade-off Analysis of Identity Management Systems with an Untrusted Identity Provider," Aug. 2008.

\* cited by examiner

IDENTITY PROVIDER DISCOVERY SERVICE USING A PUBLISH-SUBSCRIBE MODEL

CROSS-REFERENCE TO RELATED APPLICATION

This application is related to Ser. No. 12/959,413, filed Dec. 3, 2010, titled "Method and system for identity provider instance discovery."

BACKGROUND OF THE INVENTION

Technical Field

This disclosure relates generally to management of computing resources in a federated environment.

Background of the Related Art

Federated environments are well known in the art. A federation is a set of distinct entities, such as enterprises, organizations, institutions, or the like, that cooperate to provide a single-sign-on, ease-of-use experience to a user. A federated environment differs from a typical single-sign-on environment in that two enterprises need not have a direct, pre-established, relationship defining how and what information to transfer about a user. Within a federated environment, entities provide services that deal with authenticating users, accepting authentication assertions (e.g., authentication tokens) that are presented by other entities, and providing some form of translation of the identity of the vouched-for user into one that is understood within the local entity. Federation eases the administrative burden on service providers. A service provider (SP) can rely on its trust relationships with respect to the federation as a whole; the service provider does not need to manage authentication information, such as user password information, because it can rely on authentication that is accomplished by a user's authentication home domain, which is the domain at which the user authenticates.

In particular, a federated entity may act as a user's home domain that provides identity information and attribute information about federated users. An entity within a federated computing environment that provides identity information, identity or authentication assertions, or identity services, is termed an identity provider (IdP). Other entities or federation partners within the same federation may rely on an identity provider for primary management of a user's authentication credentials, e.g., accepting a single-sign-on token that is provided by the user's identity provider. An identity provider is a specific type of service that provides identity information as a service to other entities within a federated computing environment.

Federated single sign-on (F-SSO) allows for user to interact directly with a service provider (SP) and leverage a secure trust relationship between the SP and an IdP for the purpose of receiving identity information in the context of authentication.

A typical model for identity provider discovery is a service that interacts directly with an end user. This approach is useful is a wide variety of scenarios, e.g., to allow the end user to choose from a list of available identity providers, or to facilitate attribute consent. Known discovery service implementations typically operate in a standalone manner, or by being embedded directly into a service provider. At a high level, one typical discovery model works as follows. The end user accesses an application (the SP) and then manually chooses an identity provider. The service provider then redirects the end user to the chosen identity provider. The end user authenticates to the identity provider, which (following authentication) then redirects the end user (typically through an HTTP-based redirect) back to the application. The IdP also provides the SP an identity assertion, such as a Security Assertion Markup Language (SAML) assertion, or a token, that provide evidence that the federated user has been authenticated. An end user session is then established between the federated user and the SP to complete the process.

Another typical discovery approach is for the SP to redirect the user to another service, which then interacts with the user to choose the IdP. That service then redirects the user to the IdP for authentication, and then the user is redirected back to the SP.

In some scenarios, a single identity provider may be implemented over geographically distributed instances. In this case, a user who attempts to access an SP needs to be directed to the closest or most appropriate IdP instance. This operation can be provided by an identity provider instance discovery service, as described in U.S. Ser. No. 12/959,413, which is commonly-owned. An IdP instance discovery service provides automated discovery of, and binding to, a particular identity provider instance of a set of identity provider instances. In this approach, the selection of a particular identity provider may be based on one or more criteria, such as user proximity (network or geographic), IdP instance load or availability, IdP instance capabilities, a performance metric associated with a particular instance, an existing IdP binding, or some combination.

Although an IdP instance discovery service allows a service provider to dynamically retrieve the location of the appropriate IdP instance for completion of the F-SSO protocol, such techniques are designed to operate externally to the F-SSO environment, and they depend on a "pull-based" approach to obtain IdP instance information as needed.

BRIEF SUMMARY

This disclosure describes an enhanced identity provider instance discovery service (IdPIDS). In this approach, a discovery service proxy preferably is integrated within an F-SSO environment (which may be cloud-based) and is used to interact with an external IdP instance discovery service. The discovery service proxy proxies IdP instance requests to the discovery service and receives responses to such requests. A response typically includes the identity of the instance that has been assigned by the discovery service to handle the request. The proxy maintains a cache in which the instance assignment(s) are stored. As new instance requests are received at the proxy, the proxy may use the cached assignment data to provide appropriate responses in lieu of proxying these requests to the discovery service, thereby reducing the time needed to identify the required IdP instance. The proxy dynamically maintains and manages it local cache by subscribing to updates from the discovery service, where the updates identify IdP instance changes (such as servers being taken offline for maintenance, new services being added, and the like) occurring within the set of geographically distributed instances that comprise the IdP service. Preferably, the updates are provided to the proxy using a publication-subscription (pub-sub) model such that the proxy receives notifications about changes in the back-end IdP service proactively.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
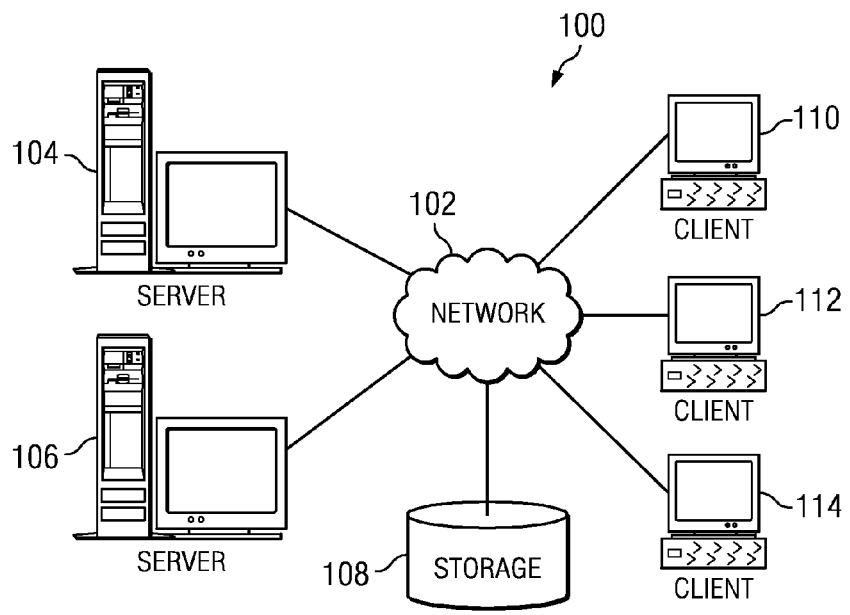
FIG. 1 depicts an exemplary block diagram of a distributed data processing environment in which exemplary aspects of the illustrative embodiments may be implemented.
Figure 2:
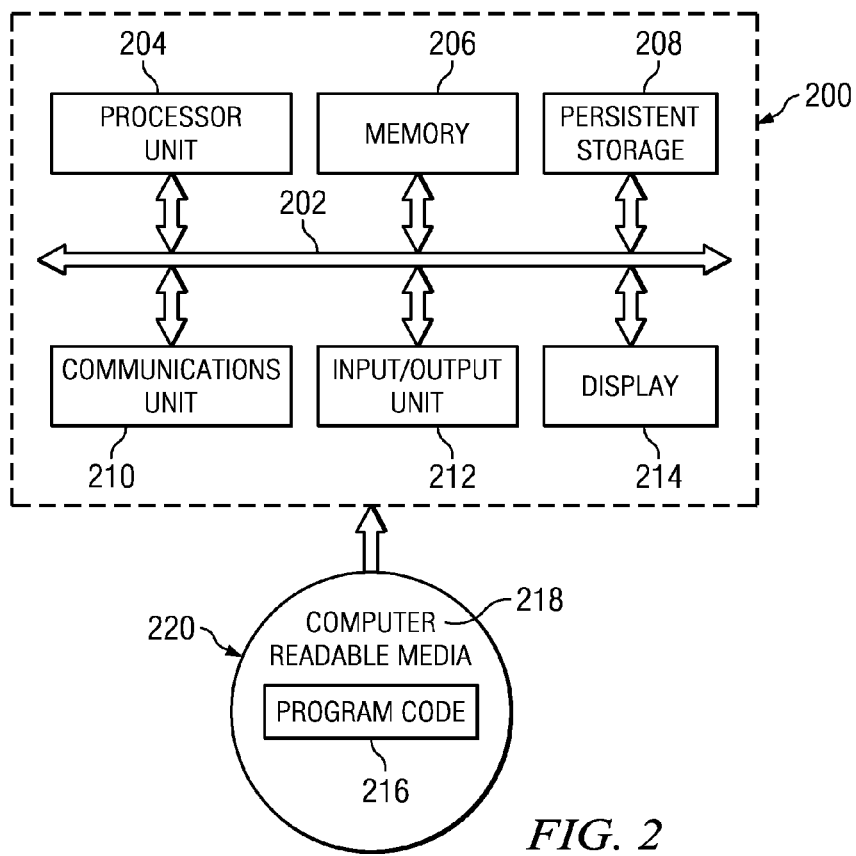
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

The Client-Server Model

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

The Federation Model

As described above, in one embodiment herein the identity provider instance discovery is implemented within the context of a "federated" environment. Thus, the following background is provided. In general, an enterprise has its own user registry and maintains relationships with its own set of users. Each enterprise typically has its own means of authenticating these users. However, in a federated scheme, enterprises cooperate in a collective manner such that users in one enterprise can leverage relationships with a set of enterprises through an enterprise's participation in a federation of enterprises. Users can be granted access to resources at any of the federated enterprises as if they had a direct relationship with each enterprise. Users are not required to register at each business of interest, and users are not constantly required to identify and authenticate themselves. Hence, within this federated environment, an authentication scheme allows for a single-sign-on experience within the rapidly evolving heterogeneous environments in information technology.

As is well-known, a federation is a set of distinct entities, such as enterprises, logical units within an enterprise, organizations, institutions, etc., that cooperate to provide a single-sign-on, ease-of-use experience to a user; a federated environment differs from a typical single-sign-on environment in that two enterprises need not have a direct, pre-established, relationship defining how and what information to transfer about a user. Within a federated environment, entities provide services which deal with authenticating users, accepting authentication assertions (e.g., authentication tokens) that are presented by other entities, and providing some form of translation of the identity of the vouched-for user into one that is understood within the local entity.

Federation eases the administrative burden on service providers. A service provider can rely on its trust relationships with respect to the federation as a whole; the service provider does not need to manage authentication information, such as user password information, because it can rely on authentication that is accomplished by a user's authentication home domain or an identity provider. A federated environment allows a user to authenticate at a first entity, which may act as an issuing party to issue an authentication assertion about the user for use at a second entity. The user can then access protected resources at a second, distinct entity, termed the relying party, by presenting the authentication assertion that was issued by the first entity without having to explicitly re-authenticate at the second entity. Information that is passed from an issuing party to a relying party is in the form of an assertion, and this assertion may contain different types of information in the form of statements. For example, an assertion may be a statement about the authenticated identity of a user, or it may be a statement about user attribute information that is associated with a particular user. Furthermore, this information can be used by a relying party to provide access to the relying party's resources, based on the relying party's access control rules, identity mapping rules, and possibly some user attributes that are maintained by the relying party.

An identity provider (IdP) is a specific type of service that provides identity information as a service to other entities within a federated computing environment. With respect to most federated transactions, an issuing party for an authentication assertion would usually be an identity provider; any other entity can be distinguished from the identity provider. Any other entity that provides a service within the federated computing environment can be categorized as a service provider. Once a user has authenticated to the identity provider, other entities or enterprises in the federation may be regarded as merely service providers for the duration of a given federated session or a given federated transaction.

Although it may be possible that there could be multiple enterprises within a federated environment that may act as identity providers, e.g., because there may be multiple enterprises that have the ability to generate and validate a user's authentication credentials, etc., a federated transaction usually involves only a single identity provider. If there is only a single federated entity that is able to authenticate a user, e.g., because there is one and only one entity within the federation with which the user has performed a federated enrollment or registration operation, then it would be expected that this entity would act as the user's identity provider in order to support the user's transactions throughout the federated environment.

Figure 3:
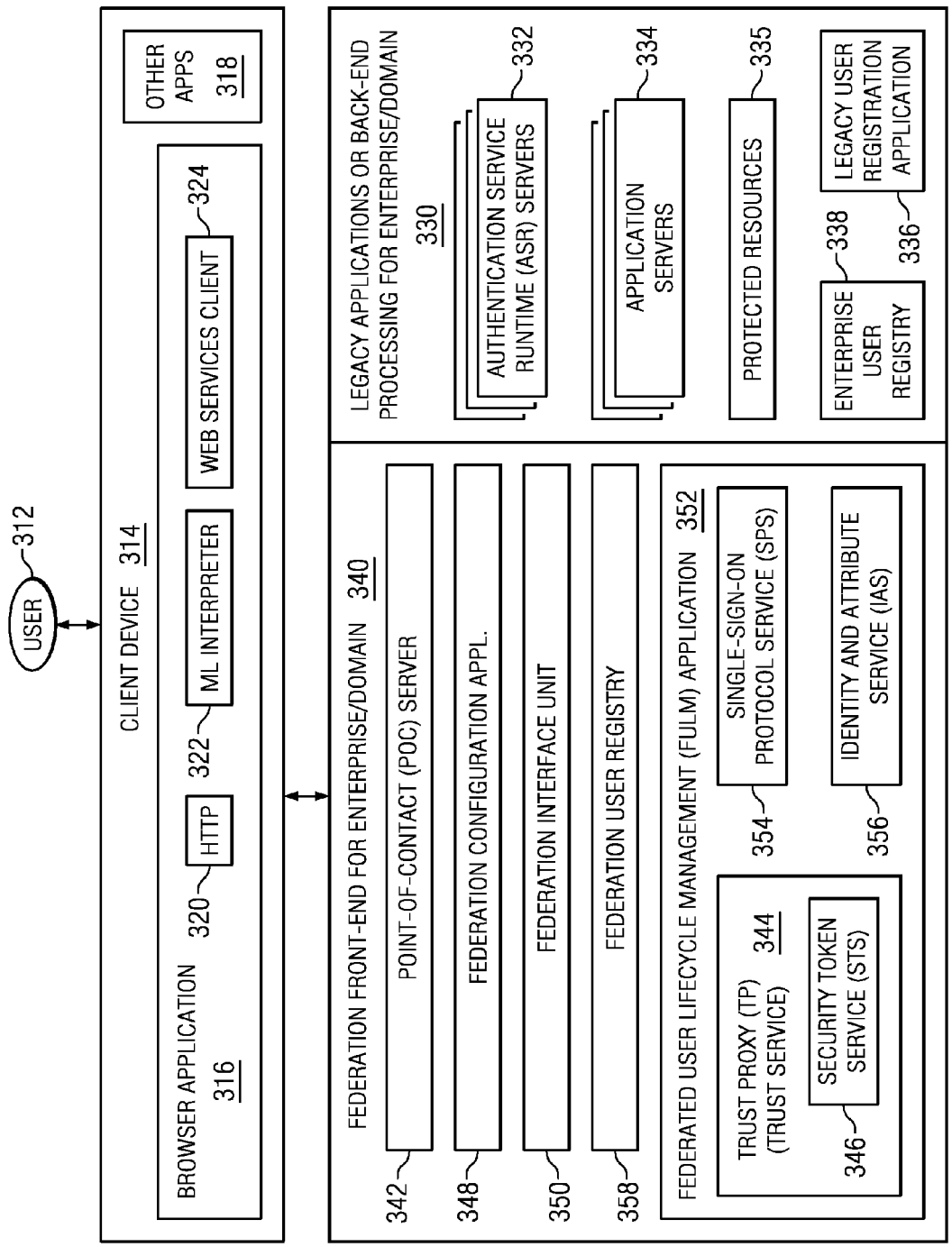
FIG. 3 illustrates a block diagram that illustrates the integration of data processing systems at a given domain with federated architecture components that may be used to support an embodiment of the described subject matter.

With reference now to FIG. 3, a block diagram depicts the integration of pre-existing data processing systems at a given domain with some federated architecture components that may be used to support an identity provider. A federated environment includes federated entities that provide a variety of services for users. User 312 interacts with client device 314, which may support browser application 316 and various other client applications 318. User 312 is distinct from client device 314, browser 316, or any other software that acts as interface between user and other devices and services. In some cases, the following description may make a distinction between the user acting explicitly within a client application and a client application that is acting on behalf of the user. In general, though, a requester is an intermediary, such as a client-based application, browser, SOAP client, or the like, that may be assumed to act on behalf of the user.

Browser application 316 may be a typical browser that comprises many modules, such as HTTP communication component 320 and markup language (ML) interpreter 322. Browser application 316 may also support plug-ins, such as web services client 324, and/or downloadable applets, which may or may not require a virtual machine runtime environment. Web services client 324 may use Simple Object Access Protocol (SOAP), which is a lightweight protocol for defining the exchange of structured and typed information in a decentralized, distributed environment. SOAP is an XML-based protocol that consists of three parts: an envelope that defines a framework for describing what is in a message and how to process it; a set of encoding rules for expressing instances of application-defined data types; and a convention for representing remote procedure calls and responses. User 312 may access web-based services using browser application 316, but user 312 may also access web services through other web service clients on client device 314. Some of the federated operations may employ HTTP redirection via the user's browser to exchange information between entities in a federated environment. However, the described techniques may be supported over a variety of communication protocols and is not meant to be limited to HTTP-based communications. For example, the entities in the federated environment may communicate directly when necessary; messages are not required to be redirected through the user's browser.

Components that are required for a federated environment can be integrated with pre-existing systems. FIG. 3 depicts one embodiment for implementing these components as a front-end to a pre-existing system. The pre-existing components at a federated domain can be considered as legacy applications or back-end processing components 330, which include authentication service runtime (ASR) servers 332 in a manner similar to that shown in FIG. 4. ASR servers 332 are responsible for authenticating users when the domain controls access to application servers 334, which can be considered to generate, retrieve, or otherwise support or process protected resources 335. The domain may continue to use legacy user registration application 336 to register users for access to application servers 334. Information that is needed to authenticate a registered user with respect to legacy operations is stored in enterprise user registry 338; enterprise user registry 338 may be accessible to federation components as well.

After joining a federated environment, the domain may continue to operate without the intervention of federated components. In other words, the domain may be configured so that users may continue to access particular application servers or other protected resources directly without going through a point-of-contact server or other component implementing this point-of-contact server functionality; a user that accesses a system in this manner would experience typical authentication flows and typical access. In doing so, however, a user that directly accesses the legacy system would not be able to establish a federated session that is known to the domain's point-of-contact server.

The domain's legacy functionality can be integrated into a federated environment through the use of federation front-end processing 340, which includes point-of-contact server 342 and trust proxy server 344 (or more simply, trust proxy 344 or trust service 344) which itself interacts with Security Token Service (STS) 346. Federation configuration application 348 allows an administrative user to configure the federation front-end components to allow them to interface with the legacy back-end components through federation interface unit 350. Federated functionality may be implemented in distinct system components or modules. Typically, most of the functionality for performing federation operations may be implemented by a collection of logical components within a single federation application; federated user lifecycle management application 352 includes trust service 344 along with single-sign-on protocol service (SPS) 354. Trust service 344 may comprise an identity-and-attribute service (IAS) 356, which is service that is responsible for operations involving identity mapping, attribute retrieval, and the like, as part of federation functionality. Identity-and-attribute service 356 may also be employed by single-sign-on protocol service 354 during single-sign-on operations. A federation user registry 358 may be employed in certain circumstances to maintain user-related information for federation-specific purposes.

The Cloud Computing Model

By way of additional background, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 4:
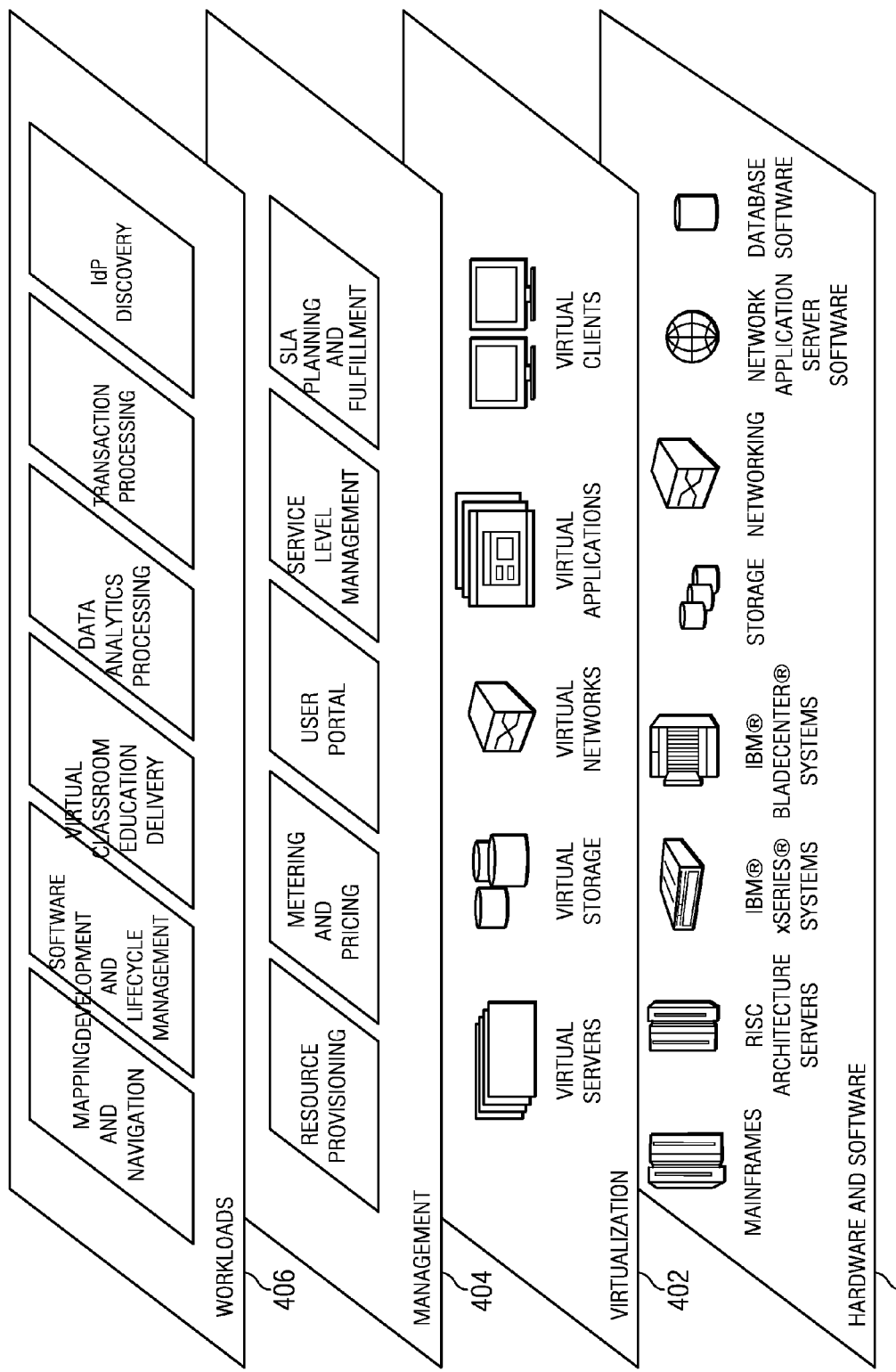
FIG. 4 depicts abstraction model layers of a cloud compute environment in which an identity provider discovery process may be implemented according to an embodiment of the invention.

Referring now to FIG. 4, by way of additional background, a set of functional abstraction layers provided by a cloud computing environment is shown. It should be understood in advance that the components, layers, and functions shown in FIG. 4 are intended to be illustrative only and embodiments of the invention are not limited thereto. As depicted, the following layers and corresponding functions are provided:

Hardware and software layer 400 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 402 provides an abstraction layer from which the following examples of virtual entities may be provided: virtual servers; virtual storage; virtual networks, including virtual private networks; virtual applications and operating systems; and virtual clients.

In one example, management layer 404 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 406 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, according to the teachings of this disclosure, identity provider instance discovery.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide F-SSO to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute the target application 410 that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud.

Identity Provider Instance Discovery

It is also known to provide an identity provider (IdP) instance discovery service, sometimes referred to as "IdPIDS." Preferably, the IdPIDS is accessed automatically (e.g., via a Web services call) from a federated service provider (SP) after an end user accesses the service provider to obtain a service from an application. Generally, the IdPIDS operates to select (or "choose") an identity provider instance from among a plurality of such instances. As used herein, an "instance" refers to a set of functions that are carried out by an identity provider, where such functions are replicated or mirrored in each other "instance." Thus, each identity provider "instance" can be thought of as functionally-equivalent to another such instance, at least with respect to the handling of an end user client interaction. A particular identity provider instance thus may exist at a particular location, a particular time, or upon a given occurrence. In general, the IdPIDS operates to locate an "optimal" identity provider instance from among a plurality of such instances that may be used to receive an end user client binding, although the term "optimal" should not be taken to limit the disclosed subject matter. A particular "instance" may be "better" than another such instance but not necessarily the "best" with respect to some abstract or defined criteria. At a minimum, an IdPIDS operates to select a given IdP instance over another such instance based on a given "selection" criteria. As will be described in more detail below, the selection criteria may be quite varied, and it is typically one of: a network proximity between an computing entity (e.g., the end user client machine, or some other machine) and one or more of the identity provider instances, a geographic proximity between a computing entity and one or more of the identity provider instances, a load associated with one or more of the identity provider instances, availability of one or more identity provider instances, a capability associated with one or more identity provider instances (including, without limitation, whether the IdP instance supports the required F-SSO protocol/method), a performance metric associated with one or more identity provider instances, an existing binding associated with one or more identity provider instances, whether the SP has an established partner relationship with one or more specific instances, and the like.

Figure 5:
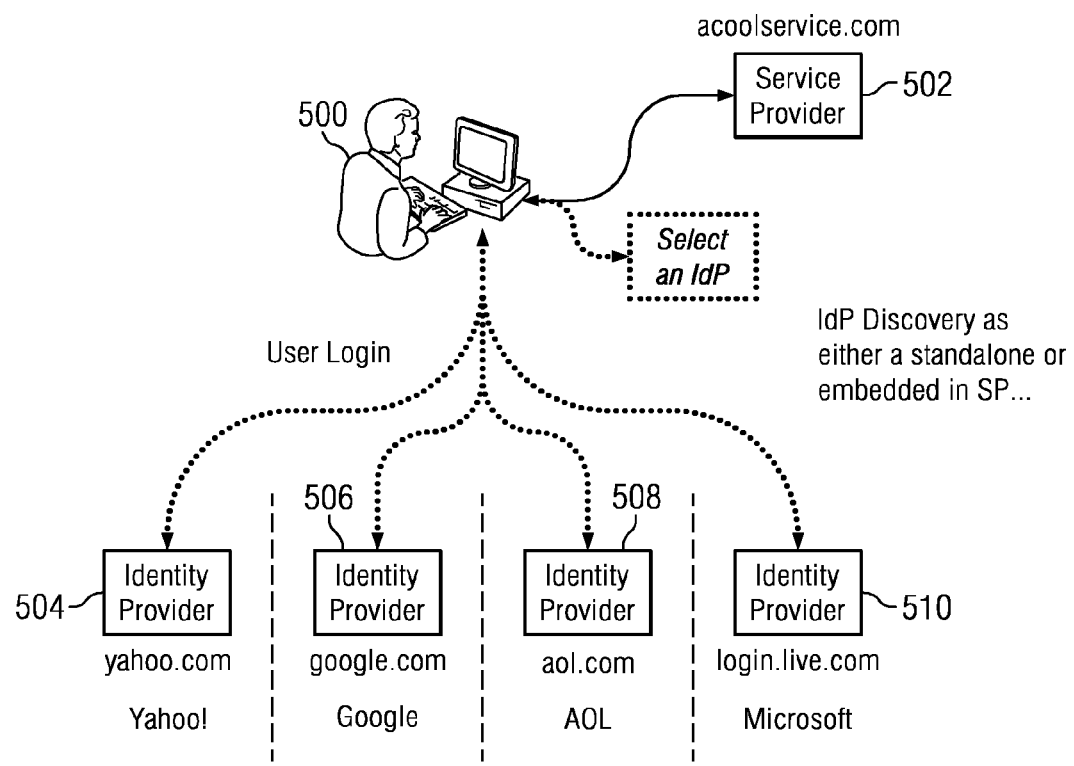
FIG. 5 illustrates a general technique for enabling discovery of an identity provider.

The following provides additional background on the basic problem of identity provider discovery generally. In FIG. 5, it is assumed that an end user 500 desires to obtain a service from a service provider 502 and has a number of distinct identity provider options, such as identity providers 504, 506, 508 and 510. In this example, the identity providers are unaffiliated with one another and represent commercial authentication services. Known discovery service implementations such as illustrated in FIG. 5 operate in a standalone manner, or by being embedded directly into a service provider. At a high level, the discovery model works as follows. The end user 500 accesses the service provider 502 (as used herein, "service provider" and the associated SP "application" may be used synonymously) and then manually chooses an identity provider. The service provider then redirects the end user to the chosen identity provider he or she desires to use, e.g., "www.yahoo.com", IdP 504. The end user authenticates to the identity provider, which (following authentication) then redirects the end user (typically through an HTTP-based redirect) back to the SP 502. The IdP 504 also provides the SP 502 an identity assertion, such as a Security Assertion Markup Language (SAML) assertion, or a token, that provide evidence that the federated user has been authenticated. An end user session is then established between the federated user and the SP to complete the process.

Figure 6:
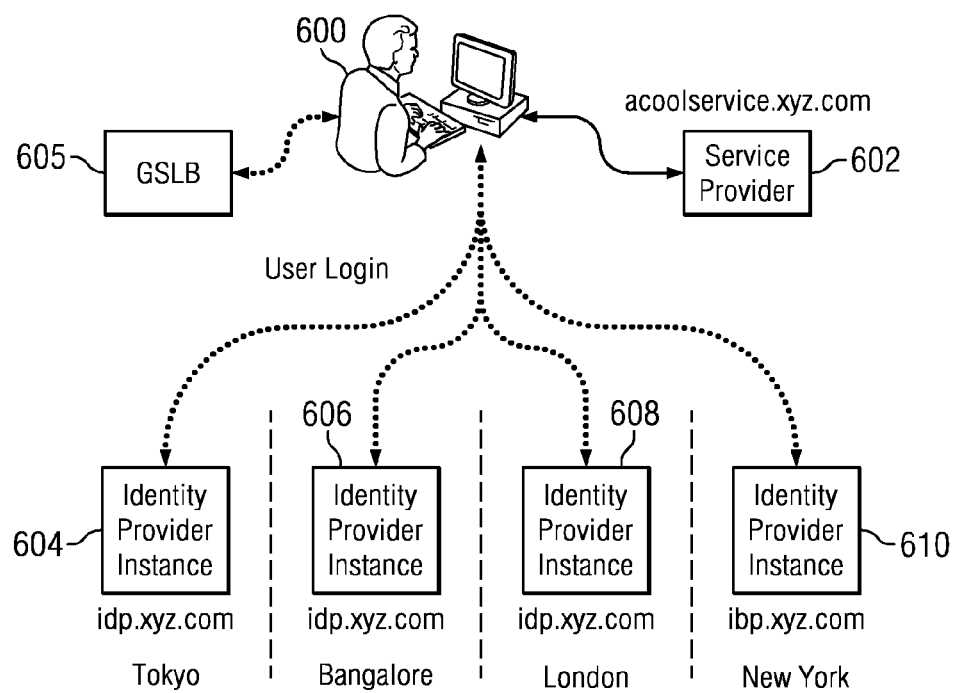
FIG. 6 illustrates a known load balancing DNS-based mechanism for binding or routing an end user to a particular IdP instance.

The approach shown in FIG. 5 does not involve identity provider "instances," as each identity provider 504, 506, 508 and 510 operates independently. Referring now to FIG. 6, a known single logical IdP discovery service is provided with multiple IdP instances. The discovery service is accessible by service provider 602. In this embodiment, all IdP instances 604, 606, 608 and 610 preferably share a common site (DNS) name, such as "idp.xyz.com," and each instance is located in a particular location (Tokyo, Bangalore, London and New York). A global service load balancing (GSLB) mechanism 605 routes the end user 600 to a specific IdP instance. In one approach, the GSLB is DNS-based, although routing may be carried out at other layers of the conventional OSI model. Thus, in an alternative approach, BGP-based routing criteria may be used to determine which instance is selected. More sophisticated GSLB-based approaches may include advisor components that enable more fine-grained site-selection criteria.

Figure 7:
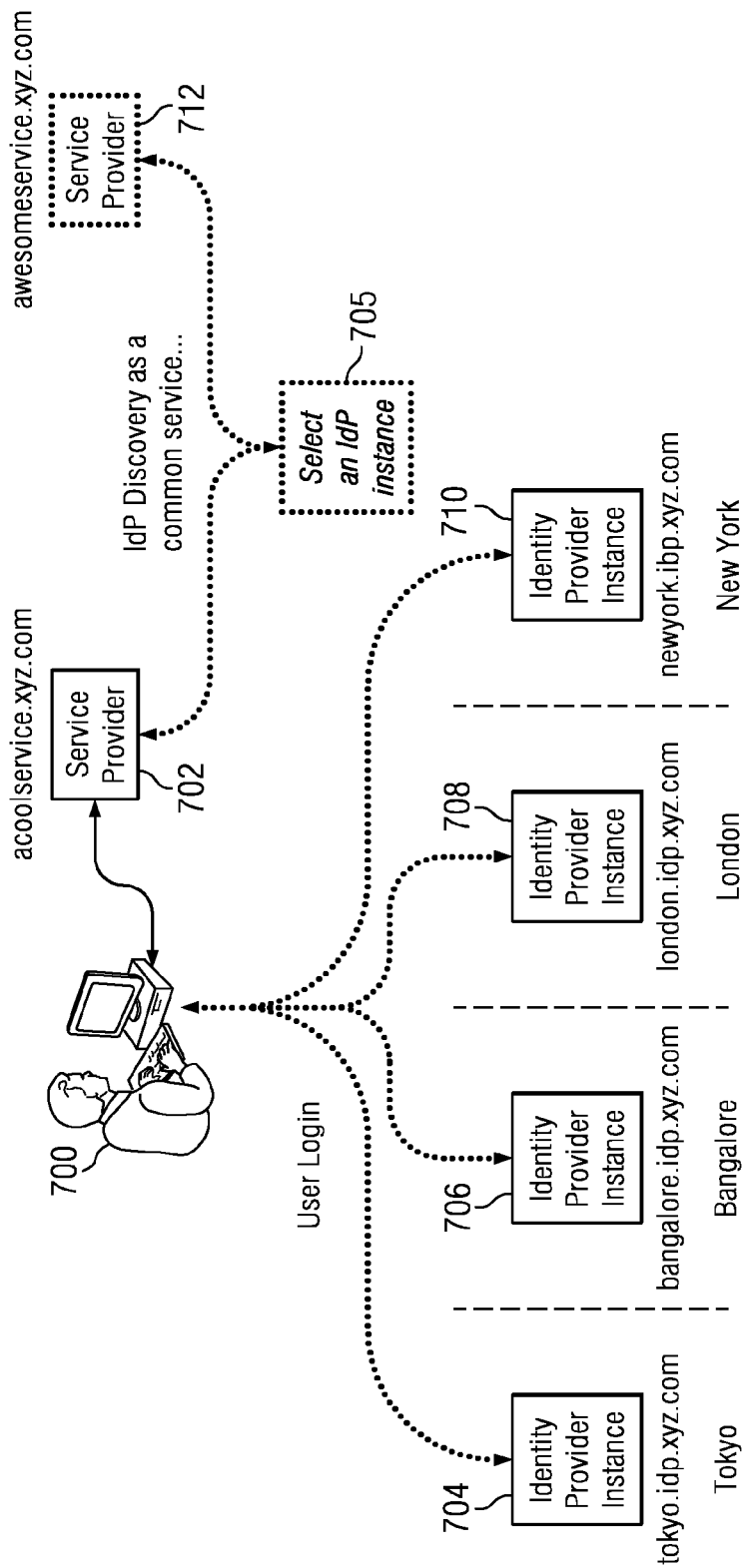
FIG. 7 illustrates a known intra-enterprise IdP instance discovery service (IdPIDS)

FIG. 7 describes an intra-enterprise IdP discovery technique in an embodiment in which an enterprise has multiple IdP instances and supports multiple applications implemented as federated service providers. In this embodiment, as in FIG. 6, there are multiple identity provider instances 704, 706, 708 and 710 that, for purposes of illustration only, are located in distinct geographic locations, such as Tokyo, Bangalore, London and New York. Unlike FIG. 6, wherein a GSLB-based routing mechanism is used to select the IdP instance, here the identity provider discovery is carried out or implemented as a "service" itself. The discovery method is provided by an identity provider instance discovery service or "IdPIDS." In this scenario, an end user 700 makes a request to a service provider 702, and this request automatically (or programmatically) calls out to the IdPIDS service 705 that is then used to select an IdP instance from among the instances 704, 706, 708 and 710, each of which is identified by its unique sub-domain [city].idp.xyz.com. As also shown in FIG. 7, one or more other services providers, such as SP 712, also use the IdPIDS service 705. The IdPIDS service selects a given IdP instance based on one or more criteria including, without limitation, user proximity to each IdP (network or geographic), IdP load or availability, IdP capability, an existing IdP binding, or some combination thereof. Preferably, the service makes the selection without requiring direct end user involvement in the process of choosing a given instance (although the end user may be involved in selecting the identity provider service initially.

Figure 8:
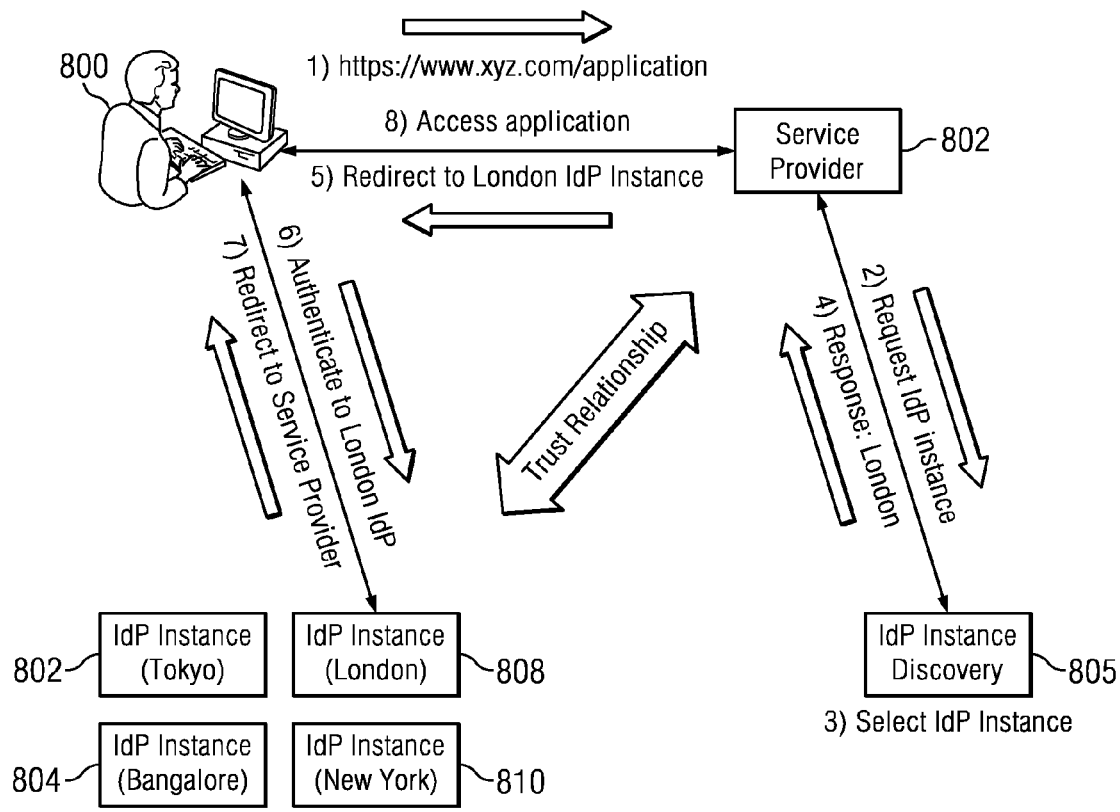
FIG. 8 illustrates the interactions among the SP, IdPIDS and IdP components in the embodiment of FIG. 7.

FIG. 8 illustrates the IdP instance discovery process in more detail. In this example, the end user 800 has established a connection to a service provider 802, preferably via SSL, TLS, or the like. At step (1), the client browser passes a request, such as "https://www.xyz.com/application/", to the service provider 802. At step (2), service provider 802 makes a Web services request for an IdP instance to the IdPIDS service 805. At step (3), the IdPIDS selects an IdP instance from among the instances 804, 806, 808 and 810. In this example, IdPIDS 805 has selected the London instance. Thus, at step (4), the IdPIDS 805 returns a response to the request that was passed in step (2). Typically, this response is a URL, which at step (5) is returned to the client browser by the SP as a redirect target. At step 6, the browser is redirected to the selected IdP instance, in this case the London instance 808, and authentication to the London IdP instance is requested. After the user is authenticated in a known manner, at step (7) the London-based IdP instance 808 issues a redirect to the end user browser, which redirect causes the client browser to return back to the service provider 802. This is step (8). The service provider 802 has a trust relationship with the selected IdP instance (as described above with respect to FIG. 3). The SP, however, may or may not have a trust relationship with each IdP instance; in appropriate circumstances, and as noted above, the existence of such a relationship (or its lack) may be among the selection criteria used. The user's authenticated identity is passed from the IdP instance 808 to the service provider 802 through this federated trust relationship 812, which may be implemented using a variety of known mechanisms including SAML, OpenID, or the like. This completes the processing.

Thus, according to the embodiment, when an end user (client) accesses the application (service provider), the service provider makes a request to the IdPIDS, passing it the client's IP address or other relevant information (e.g., an application identifier, a cookie indicating a previous IdP binding, or the like). As a service, the IdPIDS determines the appropriate IdP instance through one or more techniques, and returns to response to the service provider. The service provider then redirects the client to the IdP, typically through an HTTP redirect. This redirection can invoke an IdP-initiated or SP-initiated F-SSO endpoint as appropriate, depending on the specific F-SSO protocol/binding used and any requirements of the local configuration. The IdP authenticates the client in the usual manner, and then redirects (once again, via an HTTP 302) the user back to the service provider. The user's authenticated identity (as generated by the selected IdP instance) is passed to the service provider via a federated trust relationship. In this manner, the selected F-SSO protocol/binding is used to pass the appropriate identity information to the SP, and ultimately the user is redirected to the service originally requested.

As described, the IdPIDS may implement a variety of means to determine an appropriate instance. For example, based upon the client IP address, the IdPIDS may make a selection based upon close (or optimal) network proximity to the IdP instance. Network proximity may be determined by latency, round-trip time (RTT), number of autonomous system (AS) hops, packet loss, or some combination thereof. In lieu of network proximity, the decision may be based on geographic proximity, in which case the "closest" data center may be selected. During this process, IP range mapping or IP to country/geographic mapping may be used. The selection criteria may be a given function of both network and geographic location. Or, the selection process may be based on how "busy" (loaded) a particular IdP instance may be or whether the IdP instance is available at the time of the particular request. To that end, preferably each IdP instance is in communication with the IdPIDS service, and a suitable request-response protocol is used to transfer status and load data from the IdP instance to the service. Generalizing, typically the state of each IdP instance is known (or could be known) to all IdPIDS instances, which can be accomplished through a variety of means, such as using monitoring capabilities that directly alert or provide data to the IdPIDS instances indicating the "health" or availability of IdP instances, potentially including data regarding specific IdP components or dependent entities. Load data may include, without limitation, CPU load, storage load, or the like. When instance load is taken into consideration, the service may perform the instance selection as a function of which instance is least-loaded at the time of the request. The instance selection, in the alternative, may be based on a combination of network and/or geographic location, and load. Thus, for example, a particular IdP instance might be closer (network-wise) than another IdP instance but be more heavily loaded, in which case the IdP may select the less-loaded IdP instance that is further away (network-wise).

The selection criteria may be based on other factors. Thus, for example, one or more (or, more generally, a subset) of the identity provider instances may have a particular capability that is not shared by all instances. In such case, the IdPIDS directs the request to one of the instances that has the desired capability (or perhaps the closest or least-loaded instance if there are several that share the capability). In general, the selection may be based on some other performance metric associated with one or more identity provider instances. Or, the selection may exploit an existing binding associated with one or more identity provider instances. That binding may be captured in any known manner, such as in a cookie.

In addition to location, load, capability or availability, selection can be based on a round-robin mechanism.

The above description of the various techniques by which the identity provider instance discovery service performs instance selection are merely representative. One or more of these criteria may be used in combination with one another, the service may use these techniques under certain circumstances and not others (e.g., on certain days, at certain times, under different load conditions, etc.), the service may use one or the other techniques by default, or with certain service providers (but not others), for certain types of federated end users, and so forth. All such variants are deemed to be within the scope of the discovery mechanism and methods implemented herein.

The IdPIDS may be implemented as a cloud service, such as represented in FIG. 4.

For scaling and/or performance and availability, the IdPIDS itself may have multiple, clustered instances at multiple delivery sites. A "clustered" IdPIDS service embodiment provides a highly scalable and highly available identity provider "back-end" discovery service for a plurality of federated applications. In this approach, the back-end service is driven by application requests (as opposed to typical front-end services which interact directly with the user). The IdP instances are organized into "clusters," with each cluster located at a given location and each instance within a cluster "co-located" with all the other instances in that cluster. Each "cluster" itself runs its own IdPIDS service; thus, the IdPIDS itself is "replicated" or "mirrored" at each cluster location. In general, an IdPIDS service instance at a particular cluster performs "instance" selection among the co-located instances themselves, or the IdPIDS may direct the request to another IdPIDS service located at another site (i.e., to another cluster). Thus, a user may be directed to an identity provider at a different delivery site for one of multiple reasons: if the local IdPIDS is then unavailable or over-loaded, for other load balancing purposes, or if the local IdPIDS does not provide the specific capability required by the application. This clustered approach also is advantageous as it enables a local IdP instance (or a cluster of such instances) to be taken down for maintenance while retaining full F-SSO capability for federated applications that are using the backend service.

The response to a particular request that is returned by an IdPIDS may include a federation-specific URL.

A particular IdP instance may be virtualized using a global service load balancing (GSLB) mechanism.

Discovery Service Proxy—IdP Instance Discovery with Publish-Subscribe

With the above as background, the techniques of this disclosure are now described.

In this approach, a "discovery service proxy" is integrated within an F-SSO cloud-based environment and interacts with an external identity provider (IdP) instance discovery service, such as any of the IdPIDS embodiments described above. Generally, the proxy proxies IdP instance requests to the discovery service and receives responses that include the IdP instance assignments and perhaps other data (such as instance state). The proxy maintains a cache (sometimes referred to as a local cache) of the instance assignment(s). As new instance requests are received, the cached assignment data (if current, as will be described) is used to provide appropriate responses in lieu of proxying these requests to the discovery service. Because the IdPIDS typically is located remote from the F-SSO environment, the use of locally cached instance assignment data reduces the time needed to identify the required IdP instance. According to this disclosure, the proxy dynamically maintains and manages its cache by subscribing to updates from the discovery service. The updates identify IdP instance changes (such as servers being taken offline for maintenance, new services being added, back-end network outages, and the like) occurring within or in association with the set of geographically-distributed instances (or instance clusters) that comprise the IdP service. Preferably, the updates are provided to the proxy from the IdPIDS via a publication-subscription model. In this manner, the proxy receives change notifications proactively (and asynchronously with respect to instance requests). The proxy uses this information to update its local cache so that the instance assignments are current and reflect the true then-existing back-end state of the IdP instances (or instance clusters).

The discovery service proxy as described typically is implemented in hardware and software, such as shown in FIG. 2 and described above. The proxy includes (or has associated therewith) a cache (or, more generally, a data store) in which instance assignment data is maintained. One or more control routines in the proxy are used to provide the various functions of the cache, namely, initializing the cache, populating the cache with initial instance assignment data, receiving and responding to instance assignment requests using the cached assignment data, and receiving change notifications from the remote discovery service (preferably, via a pub-sub subscription model) and updating the cache appropriately. These functions are described in more detail below.

Figure 9:
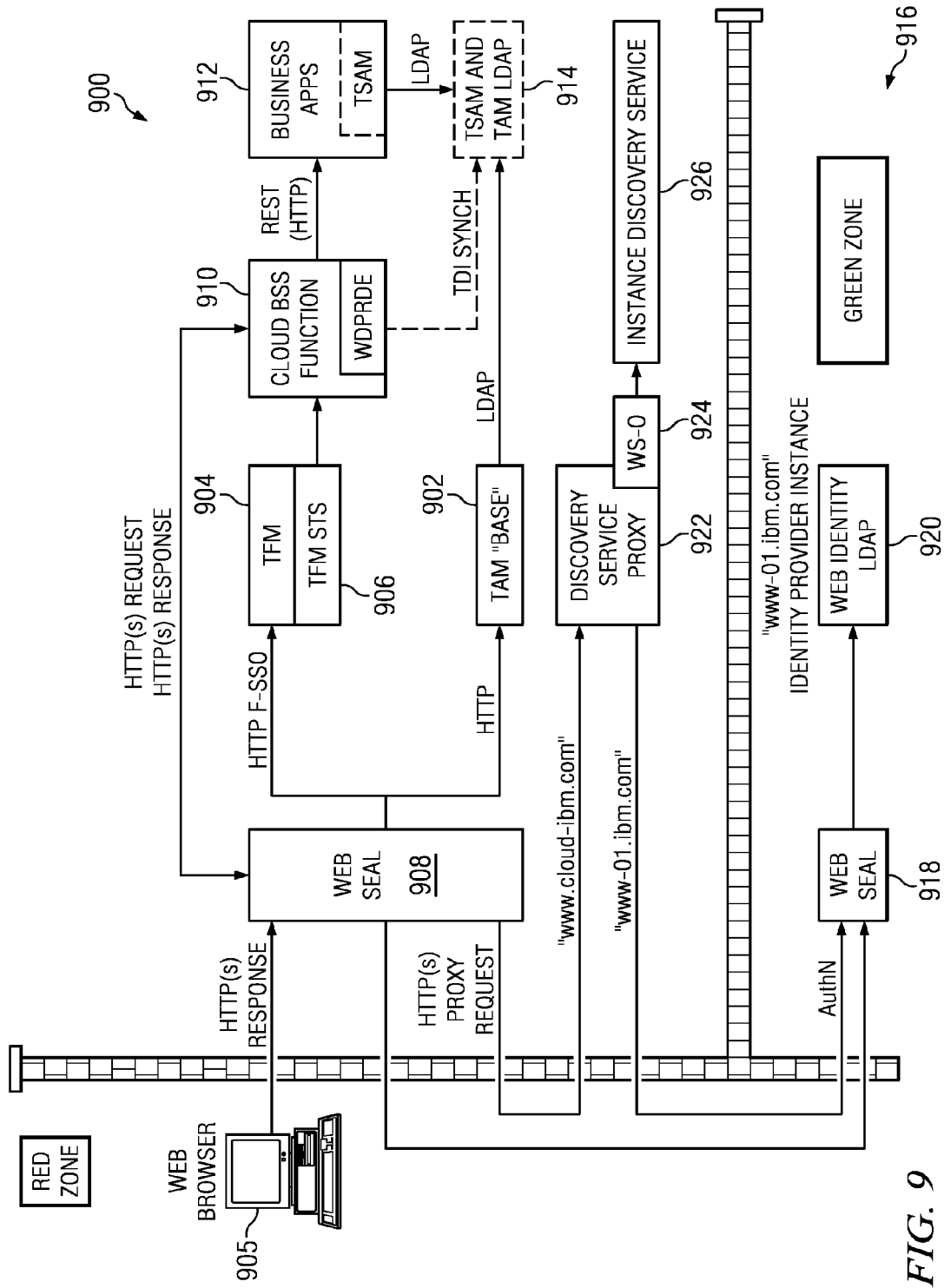
FIG. 9 illustrates an implementation of the discovery service proxy within an F-SSO cloud compute environment.

FIG. 9 illustrates an implementation of the discovery service proxy within the context of a cloud-based embodiment that implements F-SSO authentication and access to one or more business applications supported in the cloud. Generally, and as will be described, the discovery service proxy is used to provide an interface to the (typically remote) discovery service for determination of the appropriate IdP instance to be used to service a particular IdP instance request.

As described generally above, the cloud environment 900 comprises a set of high level functional components that typically include a front end identity manager, a business support services (BSS) function component, an operational support services (OSS) function component (not shown), and the compute cloud component. As shown in FIG. 9, which has been simplified for purposes of explanation, a base access manager 902 is implemented via the Tivoli® Access Manager for e-business (TAMeb) product, which is available commercially from IBM. F-SSO support is provided by a protocol service module 904, which may be implemented by the Tivoli Federated Identity Manager (TFIM) that is available from IBM. The protocol service module 904 includes an associated security token service (STS) 906 that implements secure messaging mechanisms of Web Services Trust (WS-Trust) to define additional extensions for the issuance, exchange, and validation of security tokens. The WS-Trust protocol allows a Web service client to request of some trusted authority that a particular security token be exchange for another. A high performance, multi-threaded Web server 908 (called WebSEAL in the figure), typically a TAM component, manages access to the identity manager. The business support services (BSS) component 910 provides the administrative functions for the environment, as has been described. In this example, one or more business application(s) 912 execute in a plurality of virtual machine instances (not shown). The customer's external data is supported in LDAP directory 914. The customer's environment 916 comprises a point-of-contact 918 (such as WebSEAL), and an LDAP directory 918. Client access is provided via a web browser 920 or via a "rich" client, i.e. a machine supporting a direct access client. Other common management platform components, databases and the services are provided in a known manner. Of course, the particular details of the cloud-compute infrastructure are not intended to be limiting.

In FIG. 9, the discovery service proxy 922 is located in the cloud compute environment, and it includes a Web Services Client (WS-C) 924. The WS-C 924, in the alternative, may be embedded in the WebSEAL proxy 908 or within a TFIM SSO Protocol Service module 904, or within some other component. The WS-C 924 calls out to the remote identity provider instance discovery service (IdPIDS) 926 to retrieve the identity (URL) of an appropriate identity provider instance to be used. As has been described above, this decision (by the IdPIDS) can be based on a number of factors, such as the current location of the discovery service proxy, the intended IdP, the application that is requesting the F-SSO, and other information including, without limitation, "back-end" information known to the IdPIDS such as load, network status, and the like.

To support a more performant environment, including one that can operate should the IdPIDS service itself become unavailable, the discovery service proxy 922 maintains a cache 928 of the instance assignments. As noted above, the proxy also executes an update service to dynamically maintain and manage its local cache. This operation is now described.

Figure 10:
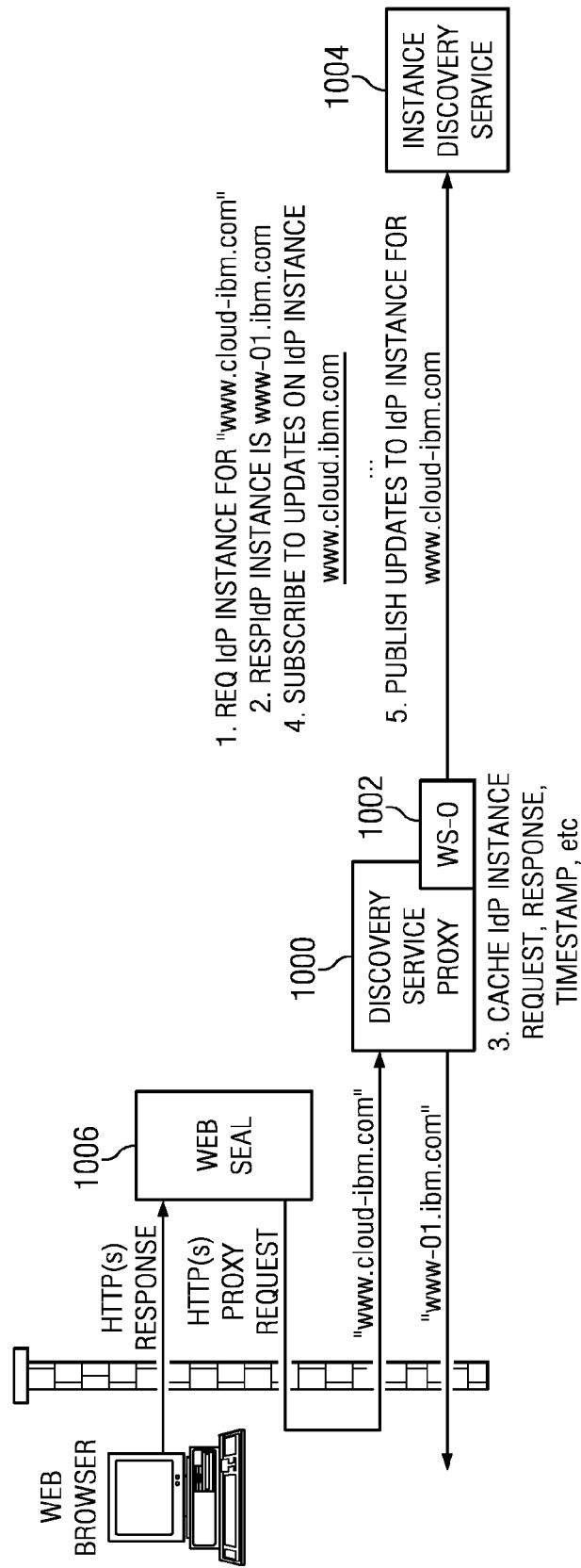
FIG. 10 illustrates a publish-subscribe mechanism implemented by the discovery service proxy and the IdPIDS according to the teachings of this disclosure.

FIG. 10 illustrates a preferred operation of the technique. In this example, the discovery service proxy 1000 uses it associated WS-C 1002 to communicate with the remote IdPIDS 1004. This interaction may take place over any suitable protocol, e.g., REST, SOAP, HTTP, HTTP over TLS (Transport Layer Security), or the like, or some combination thereof. The discovery service proxy 1000 also subscribes to change notifications published by the discovery service, as will be described. In this operating scenario, the discovery service proxy 1000 performs a series of initial population requests (to the discovery service 1004) as requests for IdP instances are received. These requests are associated with a particular hostname, such as "www.cloud-ibm.com" in this example). Preferably, IdP instance requests are differentiated by the target URL ("www.cloud-ibm.com"), the local IP address (e.g., 9.x.x.x of the front-end Web server 1006), the application requesting the F-SSO (the URL to which the Web server 1006 is brokering the F-SSO), and the like. Thus, the IdP request data may comprise one or a combination of such information. Referring to FIG. 10, step (1) illustrates the WS-C issuing a request for an IdP instance with respect to the hostname, and step (2) illustrates the discovery service providing the IdP instance that it (the service) has determined should be used to service the particular request. As these initial population request(s) are serviced by the discovery service 1004, the discovery service proxy receives the IdP assignments. An assignment thus associates the "request data" with the "IdP instance." At step (3), the proxy populates its local cache with the instance assignment data, and this data may include other information such as time-stamps, and the like. Data storage, lookup and retrieval from the cache may be based on any information in the IdP request. As new classes of request come through, the proxy populates its local cache with the intended destination (URL/IP address). Although not shown in FIG. 10, as repeat requests are received at the proxy, the discovery service proxy performs a lookup into the cache and re-uses the existing information provided it is still current. Thus, particular assignment data may have a time-to-live (TTL) in cache; thus, when a new (repeat) request is received at the proxy, the proxy checks to determine whether it has current assignment data for the hostname (or other request data); if so, the cache re-uses the stored assignment data instead of proxying the request to the remote discovery service.

As noted above, the proxy 1000 also subscribes to change notifications published by the instance discovery service to provide an additional increase in performance, reliability and availability of the overall service. To this end, the discovery service provides a change notification service to which the discovery service proxy subscribes. Subscription-notification mechanisms can operate in a one-to-one or one-to-many manner. Thus, the discovery service notification service may publish updates that are available to multiple proxies. The particular subscription-notification mechanism may be of any convenient type, depending on implementation. In an exemplary embodiment, the subscription-notification mechanisms specified by WS-Notification can be utilized. WS-Notification provides an open standard for Web services communication using a topic-based publish/subscribe messaging pattern. Although the specific WS-Notification will depend on the IdPIDS implementation details, in one example embodiment the notification service may be implemented using IBM WebSphere® Application Server V7.0, which implements WS-Notification based on the Java API for XML-based Web Services (JAX-WS), known as Version 7.0 WS-Notification. In the alternative, the subscription-notification mechanism specified in the OGSI (Open Grid Services Infrastructure) can be used. Other publish-subscribe (pub-sub) mechanisms that may be used for this purpose include, without limitation, WSP, available from Microsoft®.

Figure 11:
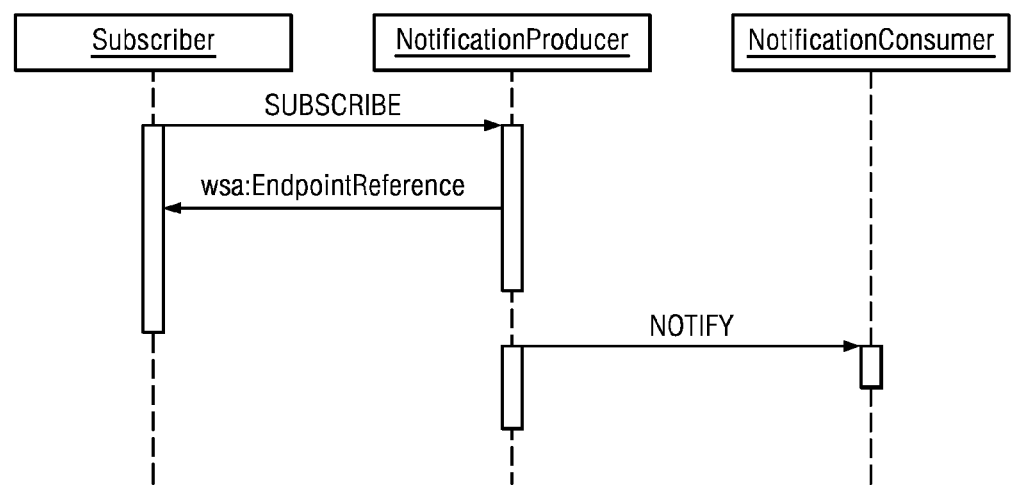
FIG. 11 illustrates a representative publish-subscribe mechanism implemented as a WS-Notification service.

Generalizing, and as seen in FIG. 11, the notification service includes a notification producer component that executes in the IdPIDS, and a notification consumer component that executes in the proxy (or the WS-C associated therewith). Each such component is implemented in software, stored in computer memory as a set of computer program instructions, and executed by one or more processors as a specialized or dedicated machine. Using an appropriate web-based or programmatic interface, one or more "Subscriptions" are created. A Subscription is a WS-Resource that represents a relationship among a notification consumer component, a notification producer component, a topic, and various other filter expressions, policies and context information. A Subscriber is an entity (in this case, the proxy, or WS-C) that acts as a service requestor, sending a subscribe request message to a notification producer component. A Subscriber may differ from the notification consumer component. To produce a notification service with additional scale, a subscription manager and/or subscription broker component may be implemented, in a known manner consistent with the WS-Notification specification.

Using a pub-sub model of this type, the discovery service proxy of this disclosure subscribes to updates from the discovery service. This allows the service proxy to receive notifications about changes to resources (e.g., networks, server clusters, servers, services, and the like) that comprise the IdP instance discovery service. The notifications may be quite varied, and they may be provided in any format. Thus, any Topic within the meaning of the WS-Notification specification may be implemented. The notifications provide the service proxy with up-to-date and time information about the discovery service generally and about particular resources in the discovery service. Thus, without limitation, the notifications may be of any nature and type. They may be coarse-grained (e.g., the "directory service is live") or fine-grained (e.g., directory service cluster instance at location A is currently out of service due to maintenance"), or the like, and they may be provided periodically (every hour, minute, or seconds) or asynchronously (as particular events occur), or some combination thereof. The notifications may be resource-specific, such as "[named resource] currently at 75% load," "[named resource] response time >2 ms" or the like. The notification may also provide information that may be used by the proxy to facilitate the discovery, an example being "attribute service unavailable, all requests requiring attributes should be routed to X" and the like. In the latter example, the IdP instance can then be selected based on the returned criteria. Of course, all of these examples are merely for illustrative purposes and should not be considered limiting.

Typically, a subscription is associated with a particular hostname or other identifiable resource in the discovery service. The notification service preferably is configurable by the IdDIDS provider or in association with the service proxy itself. Thus, in one implementation, the service proxy exports a web interface that includes one or more display screens at which notifications may be configured.

Referring back to FIG. 10, step (4) illustrates the discovery service proxy subscribing to updates on IdP instance "www.cloud-ibm.com," step (5) illustrates the discovery service publishing updates to this instance. As updates are received by the proxy, the proxy determines (based on policy or other business logic) whether and how to update its cache of instance assignment data. The particular policy or business logic may be quite varied, although typically receipt of an update implements one or more cache invalidation rules. Thus, for example, if server 1.2.3.4 in the discovery service has been used to service a prior instance request at time t, the cache may store an entry such as www.cloud-ibm.com-→server 1.2.3.4 {time t}. Upon receiving an update indicating that server 1.2.3.4 is done for maintenance, the cache may then invalidate this cache entry (e.g., by flushing it), or otherwise change the association to some other assignment. In this manner, when a new (repeat) request for the hostname is received by the proxy, a more up-to-date (or "current") assignment may be provided to the requesting client. By updating the cache based on directory service updates, the proxy dynamically maintains and manages its information about the back-end IdP instances. This enables the proxy to service instance requests from its local cache reliably and in a scalable manner, thereby off-loading requests that have to be serviced by the (typically remote) directory service.

Generalizing, the notification service includes a notification producer component that executes in the IdPIDS, and a notification consumer component that executes in the proxy (or the WS-C associated therewith). Each such component is implemented in software, stored in computer memory as a set of computer program instructions, and executed by one or more processors as a specialized or dedicated machine. Using an appropriate web-based or programmatic interface, one or more "Subscriptions" are created. A Subscription is a WS-Resource that represents a relationship among a notification consumer component, a notification producer component, a topic, and various other filter expressions, policies and context information. To produce a notification service with additional scale, a subscription manager and/or subscription broker component may be implemented, in a known manner consistent with the WS-Notification specification.

The above-described technique provides numerous advantages, as have been described. The proxy off-loads instance discovery. It enables the F-SSO operation to be implemented in the cloud environment securely and efficiently. Further, the publish-subscribe model facilitates a change notification service between the proxy and the discovery service that enhances the operation of the proxy by ensuring that its cache of assignment data is current and reflects that actual state of the resources that are available to the discovery service. The approach ensures that the discovery service proxy learns about availability issues with respect to the back-end resources (e.g., the IdP instance is taken off-line, is over-loaded, or is otherwise unavailable); thus, the proxy either can use current assignment data in its cache to respond to the request or, if it needs to go forward to the service (e.g., because of a cache miss or otherwise), the request will succeed. By dynamically maintaining and managing its local cache in this manner, the time to identify the required IdP instance is minimized. In addition, by responding to instance requests at the cache, the load on the service is minimized. When requests to the service are required, the notification service ensures that such requests are directed to active resources. The result is a more highly-available, highly-reliable, and highly-scalable directory service.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, Liberty, Shibboleth, OpenID, WS-Federation, Cardspace, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

As the above examples illustrate, one or more of the identity provider instance discovery functions may be hosted within or external to the cloud.

Still more generally, the subject matter described herein can take the form of an entirely hardware embodiment, an entirely software embodiment or an embodiment containing both hardware and software elements. In a preferred embodiment, the layered logout function is implemented in software, which includes but is not limited to firmware, resident software, microcode, and the like. The data can be configured into a data structure (e.g., an array, a linked list, etc.) and stored in a data store, such as computer memory. Furthermore, as noted above, the identity provider instance discovery functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the identity provider instance discovery components are implemented in a special purpose computer, preferably in software executed by one or more processors. The associated configuration (security levels, status, timers) is stored in an associated data store. The software also is maintained in one or more data stores or memories associated with the one or more processors, and the software may be implemented as one or more computer programs.

The identity provider instance discovery function may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

As used herein, an "identity provider instance" is an instantiation or implementation of an identity provider that is also available in one or more other such instances. Thus, in general, typically an "instance" is a fully-featured identity provider (IdP) whose functionality is mirrored or duplicated in at least one other such instance.

Of course, the identification of any commercial product herein is not meant to be taken to limit the disclosed subject matter.

Having described our invention, what we now claim is as follows.

The invention claimed is:

1. Apparatus for providing identity provider services in association with an identity provider instance discovery service distinct from and external to the apparatus, comprising:
   a processor;
   computer memory holding computer program instructions executed by the processor to carry out a set of operations comprising:
   as requests for identity provider instances are processed by the identity provider instance discovery service, receiving and storing at the apparatus data identifying the identity provider instances assigned by the identity provider instance discovery service;
   receiving at the apparatus an update concerning a resource associated with the identity provider instance discovery service, the update received from the identity provider instance discovery service via a topic-based publish-subscribe notification service;
   based on the update received at the apparatus, modifying the data; and
   upon receipt of a new request for an identity provider instance, and in lieu of forwarding the new request from the apparatus to the identity provider instance discovery service for handling, using the modified data to identify an identity provider instance for use in responding to the new request.

2. The apparatus as described in claim 1 wherein the data is assignment data that associates a request and an identity provider instance selected by the identity provider instance discovery service to service the request.

3. The apparatus as described in claim 1 wherein the update is received periodically or asynchronously.

4. The apparatus as described in claim 1 wherein the notification service is a Web service provided by the identity provider instance discovery service.

5. The apparatus as described in claim 1 wherein the operations further include subscribing to the update.

6. The apparatus as described in claim 1 wherein the update includes one of: a load associated with one or more of the identity provider instances, availability of one or more identity provider instances, a performance metric associated with one or more identity provider instances, and an existing binding associated with one or more identity provider instances.

7. The apparatus as described in claim 1 wherein the data is modified according to a policy or business logic.

8. A computer program product in a non-transitory computer readable medium for use in a data processing system for providing identity provider services in association with an identity provider instance discovery service distinct from and external to the data processing system, the computer program product holding computer program instructions which, when executed by the data processing system, perform operations comprising:
   as requests for identity provider instances are processed by the identity provider instance discovery service, receiving and storing at the data processing system data identifying the identity provider instances assigned by the identity provider instance discovery service;
   receiving at the data processing system an update concerning a resource associated with the identity provider instance discovery service, the update received from the identity provider instance discovery service via a topic-based publish-subscribe notification service;
   based on the update received at the apparatus, modifying the data; and
   upon receipt of a new request for an identity provider instance, and in lieu of forwarding the new request from the data processing system to the identity provider instance discovery service for handling, using the modified data to identify an identity provider instance for use in responding to the new request.

9. The computer program product as described in claim 8 wherein the data is assignment data that associates a request and an identity provider instance selected by the identity provider instance discovery service to service the request.

10. The computer program product as described in claim 8 wherein the update is received periodically or asynchronously.

11. The computer program product as described in claim 8 wherein the notification service is a Web service provided by the identity provider instance discovery service.

12. The computer program product as described in claim 8 wherein the operations further include subscribing to the update.

13. The computer program product as described in claim 8 wherein the update includes one of: a load associated with one or more of the identity provider instances, availability of one or more identity provider instances, a performance metric associated with one or more identity provider instances, and an existing binding associated with one or more identity provider instances.

14. The computer program product as described in claim 8 wherein the data is modified according to a policy or business logic.

15. A system for identifying identity provider instances, comprising:
   a proxy supported on a hardware element and having a cache associated therewith, the proxy issuing identity provider instance discovery requests;
   an identity provider instance discovery service that receives each identity provider instance discovery request issued by the proxy, makes a selection, and returns to the proxy, for storage in its cache, data identifying the selection, the identity provider instance discovery service distinct from and external to the proxy; and a topic-based publish-subscribe notification service by which the proxy subscribes to receive updates from the identity provider instance discovery service, at least one update concerning a resource associated with the identity provider instance discovery service and being used by the proxy to update the data stored in its cache;

wherein at least one new identity provider instance discovery request is handled by the proxy using the updated data stored in its cache in lieu of the proxy issuing the new identity provider instance discovery request to the identity provider instance discovery service for handling.

16. The system as described in claim 15 wherein the notification service operates according to a publish-subscribe model.

17. The system as described in claim 15 wherein the updates are provided periodically or asynchronously.

18. The system as described in claim 15 wherein the data stored in the cache is updated according to a policy or business logic.

* * * * *